United States Patent [19]

Obara et al.

[11] Patent Number: 5,006,693
[45] Date of Patent: Apr. 9, 1991

[54] GAP VOLTAGE DETECTOR IN A WIRE-CUT ELECTRIC DISCHARGE MACHINE

[75] Inventors: Haruki Obara, Toyama; Syunzo Izumiya, Fujiyoshida, both of Japan

[73] Assignee: Fanuc Ltd, Minamitsuru, Japan

[21] Appl. No.: 381,635
[22] PCT Filed: Jan. 30, 1989
[86] PCT No.: PCT/JP89/00087
§ 371 Date: Jul. 3, 1989
§ 102(e) Date: Jul. 3, 1989
[87] PCT Pub. No.: WO89/07032
PCT Pub. Date: Aug. 10, 1989

[30] Foreign Application Priority Data

Feb. 3, 1988 [JP] Japan .................. 63-22117

[51] Int. Cl.⁵ .................. B23H 1/02; B23H 7/14
[52] U.S. Cl. .................. 219/69.12; 219/69.13
[58] Field of Search .............. 219/69.13, 69.16, 69.12, 219/69.19

[56] References Cited

FOREIGN PATENT DOCUMENTS

| | | |
|---|---|---|
| 180719 | 9/1985 | Japan .................. 219/69.13 |
| 60-29230 | 12/1985 | Japan . |
| 61-111841 | 5/1986 | Japan . |
| 61-96626 | 6/1986 | Japan . |
| 288626 | 11/1988 | Japan .................. 219/69.13 |

Primary Examiner—Geoffrey S. Evans
Attorney, Agent, or Firm—Staas & Halsey

[57] ABSTRACT

A gap voltage detector in a wire-cut electric discharge machine is provided, which is capable of eliminating an adverse effect due to a variation in an electric discharge position, thereby detecting a gap voltage between a wire electrode and a workpiece in an accurate manner. An operational amplifier (11) of the gap voltage detector is supplied at one input terminal with the sum of a voltage between an upper conductor (4) and the workpiece detected by a voltage divider (R11, R12) and a voltage between a lower conductor (5) and the workpiece detected by another voltage divider (R21, R22), and is supplied at another input terminal through variable resistors (RV1, RV2) with an output from a detection coil (10) corresponding to a differentiation of the electric discharge current and an output from an integration circuit (12) corresponding to the electric discharge current, as a signal for correcting the voltage drop components attributable to the wire resistance and inductance between the conductors, to thereby generate the corrected sum by using the voltage drop components as a gap voltage.

2 Claims, 1 Drawing Sheet

GAP VOLTAGE DETECTOR IN A WIRE-CUT ELECTRIC DISCHARGE MACHINE

BACKGROUND OF THE INVENTION

The present invention relates to a gap voltage detector for use in a wire-cut electric discharge machine, which is capable of accurately detecting a gap voltage between a wire electrode and a workpiece.

In a wire-cut electric discharge machine, it is known to effect appropriate control of electric discharge machining on the basis of a detected value of a gap voltage between a wire electrode (hereinafter referred to as wire) and a workpiece. Conventionally, a voltage between the workpiece and a conductor disposed above or below the workpiece for connecting a machining power source with the wire, is detected as the gap voltage. However, the thus detected voltage includes voltage drop components attributable to a wire resistance between the conductor and the workpiece and an inductance therebetween. As a position at which electric discharge occurs between the wire and the workpiece varies, a variation occurs also in these voltage drop components. In particular, a large variation in these components is found when the workpiece has a large thickness. As explained above, the detected voltage includes variable components attributable to a variation in the electric discharge position, and hence cannot indicate an accurate gap voltage.

Further, it is also known to subtract a correction value representative of a voltage drop component attributable to an inductance between the conductor and the workpiece from the detected voltage, so as to correct the detected voltage, as disclosed in Japanese Provisional Patent Publication No. 61-180719. However, even in this case, the detected voltage thus corrected cannot indicate an accurate gap voltage because the just mentioned correction value does not reflect a variation of the voltage drop component. Also, the gap voltage cannot be detected accurately, in the case of effecting correction for voltage drop component associated with the wire resistance.

SUMMARY OF THE INVENTION

The object of the present invention is to provide a gap voltage detector for use in a wire-cut electric discharge machine which is capable of eliminating an adverse effect due to a variation in an electric discharge position, thereby permitting an accurate detection of a gap voltage between a wire electrode and a workpiece.

In order to achieve the aforementioned object, a gap voltage detector in a wire-cut electric discharge machine according to the present invention, comprises: means for detecting a first voltage between a first conductor and a workpiece; means for detecting a second voltage between the workpiece and a second conductor which is disposed in a facing relation with the first conductor; and means for detecting a gap voltage on the basis of the sum of the thus detected first and second voltages.

Preferably, the gap voltage detector includes means for detecting an electric discharge current, and means for detecting a differential value of the electric discharge current, and is operable to detect a first voltage drop component, attributable to a wire resistance between the first and second conductors, and a second voltage drop component, attributable to an inductance between these conductors, on the basis of the detected electric discharge current and its differential value. The device is further operable to correct the sum of the first and second voltages by the use of the detected first and second voltage drop components, to thereby detect the gap voltage.

As explained above, according to the present invention, since the gap voltage is detected on the basis of the sum of the voltages between the first conductor and the workpiece and between the second conductor and the workpiece, and preferably, the sum is corrected by the voltage drop components attributable to the wire resistance and the inductance between these conductors, an accurate gap voltage can be detected free from an adverse effect due to a variation in electric discharge position.

BRIEF DESCRIPTION OF THE PREFERRED EMBODIMENT

Figure 1:
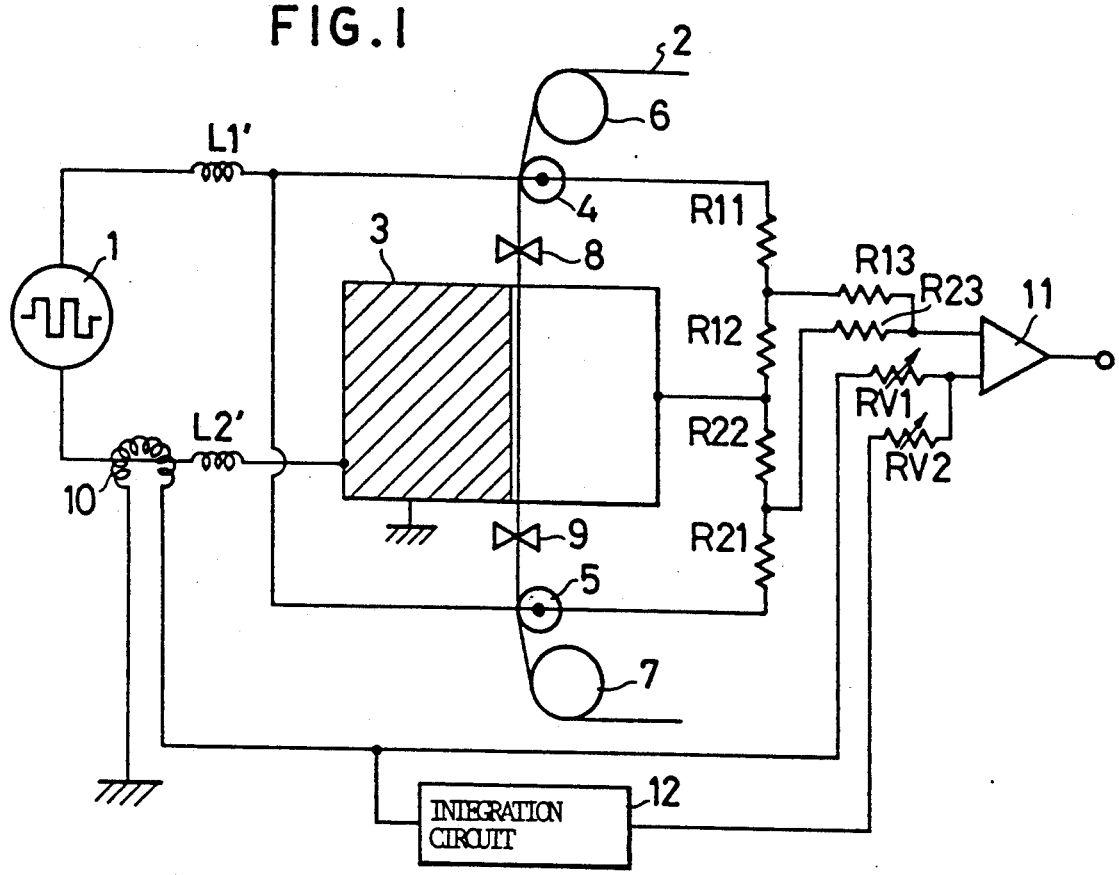
FIG. 1 is a schematic view showing an essential part of a wire-cut electric discharge machine equipped with a gap voltage detector according to an embodiment of the present invention.

Referring to FIG. 1, a wire-cut electric discharge machine equipped with a gap voltage detector according to an embodiment of the present invention, comprises an upper guide roller 6 and an upper wire guide 8 disposed above a workpiece 3, respectively, and a lower wire guide 9 and a lower guide roller 7 which are respectively disposed in a facing relation with the elements 6 and 8 with respect to the workpiece 3, and is so designed as to guide a wire 2 by means of the elements 6–9. An upper conductor 4 and a lower conductor 5 are respectively disposed in the vicinity of the wire guides 8 and 9 for contact with the wire 2. Each of these conductors is connected to one output terminal of a machining power source 1 having another output terminal connected to the workpiece 3 which is grounded.

The upper conductor 4 is connected to the workpiece 3 through a first voltage divider which consists of resistors R11 and R12 for detecting a voltage between the upper conductor 4 and the workpiece 3. The connection of the resistors R11 and R12 is connected, through a resistor R13, to a first input terminal of an operational amplifier (adder) 11 for detecting a gap voltage between the wire 2 and the workpiece 3. On the other hand, the lower conductor 5 is connected to the workpiece 3 through a second voltage divider consisting of resistors R21 and R22 for detecting a voltage between the lower conductor 5 and the workpiece 3. The connection of the resistors R21 and R22 is connected to the first input terminal of the operational amplifier 11 through a resistor R23.

Reference numeral 10 designates a detection coil for detecting a differential value of an electric discharge current. A lead wire, connecting the machining power source 1 with the workpiece 3, extends through the detection coil 11. The coil 11 has one end which is grounded, and another end which is connected to a second input terminal of the operational amplifier 11 through a first variable resistor RV1 and to an input terminal of an integration circuit 12 for detecting the electric discharge current. Further, an output terminal of the integration circuit 12 is connected to the second input terminal of the operational amplifier 11 through a second variable resistor RV2. Meanwhile, the direction of the winding of the detection coil 10 is so determined that voltages applied to the respective input terminals of the operational amplifier 11 are opposite in polarity from each other.

In the following, operation of the electric discharge machine constructed as explained above will be explained.

Upon start of operation of the electric discharge machine, an electric discharge power is supplied from the machining power source 1 to the wire 2, which is delivered along the elements 6-9 shown in FIG. 1 and passes an initial hole or a machining groove formed in the workpiece 3 to move downwardly as viewed in FIG. 1. As a result, electric discharge occurs between the wire 2 and the workpiece 3 for electric discharge machining.

Figure 2:
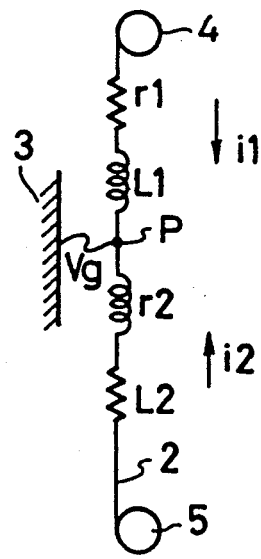
FIG. 2 is a view for explaining the principle and operation of the arrangement shown in FIG. 2.

Here, let it be assumed that electric discharge occurs at an electric discharge position indicated by reference symbol P in FIG. 2. Voltages VU and VL between the upper conductor 4 and the workpiece 3 and between the lower conductor 5 and the workpiece 3, and the sum VG (=VU+VL) of these voltages are represented by the following equations (1) -(3), respectively. Herein, the resistors R11, R12, R21, R23 and the like are not taken into consideration.

$$VU = Vg + r1 \cdot i1 + L1 \cdot (di1/dt) \quad (1)$$

$$VL = Vg + r2 \cdot i2 + L2 \cdot (di2/dt) \quad (2)$$

$$VG = 2Vg + r1 \cdot i1 + r2 \cdot i2 + L1 \cdot (di1/dt) + L2 \cdot (di2/dt) \quad (3)$$

where Vg denotes the gap voltage; r1, the wire resistance between the upper conductor 4 and the electric discharge position P; L1, the inductance between the upper conductor 4 and the discharge position P; r2, the wire resistance between the lower conductor 5 and the discharge position P; L2, the inductance between the lower conductor 5 and the discharge position P; i1, the electric current flowing through the upper conductor 4; and i2, the electric current flowing through the lower conductor 5 (See, FIG. 2).

The inductances L1 and L2 are considerably smaller than the inductance L1' between the machining power source 1 and the upper and lower conductors 4 and 5 and the inductance L2' between the workpiece 3 and the machining power source 1. Accordingly, the electric currents i1 and i2 are approximately equal to each other (i1≈i2≈i), and the following approximate equation (4) can be obtained by modifying equation (3), $$VG \approx 2 Vg + i(r1 + r2) + (L1 + L2)di/dt \quad (4)$$

In equation (4), the values r1+r2 represents the wire resistance between the conductors 4 and 5 and the value L1+L2 represents the inductance therebetween, respectively. These values are definitely determined in dependence on the construction of the electric discharge machine, and are never changed even when the electric discharge position P varies. After all, the value of the right hand side of equation (4) accurately corresponds to the gap voltage Vg.

During the electric discharge machining, a voltage indicative of the voltage VU appears at a junction of the resistors R11 and R12 of the first voltage divider which connects the upper conductor 4 and the workpiece 3, a voltage indicative of the voltage Vl appears at a junction of the resistors R21 and R22 of the second voltage divider which connects the lower conductor 5 and the workpiece 3. The sum of these voltages is applied to the first input terminal of the operational amplifier 11. The sum applied to that terminal corresponds to the value of the right hand side of the equation (4) and hence accurately corresponds to the gap voltage Vg.

During the electric discharge machining, a voltage is induced in the detection coil 10. The magnitude of the induced voltage varies in dependence on a change (differential value) di/dt in the electric discharge current flowing between the machining power source 1 and the workpiece 3, with respect to time. The detection coil 10 supplies, through the first variable resistor RV1, the second input terminal of the operational amplifier 11 with an output signal indicative of the differential value of the electric discharge current. The integration circuit 12 receives the output signal from the detection coil 10 and integrates the same signal. The integration circuit 12 then supplies, through the second variable resistor RV2, the second input terminal of the amplifier 11 with an output signal indicative of the electric discharge current i. Meanwhile, the variable resistors RV1 and RV2 are adjusted beforehand so that the voltages applied to the second input terminal of the amplifier 11 through these resistors represent the third term (L1+L2)di/dt and the second term (i(r1+r2) of the right hand side of equation (4), respectively.

The operational amplifier 11 is supplied at its first input teminal with a voltage corresponding to the sum of the first, second and third terms of the right hand side of equation (4), and is also supplied at its second input terminal with a voltage corresponding to the sum of the second and third terms of equation (4) and having an opposite polarity that the voltage applied to the first input terminal. This to thereby generates a voltage corresponding to the first term (2VG) of the equation (4). After all, The output voltage of the operational amplifier 11, free from an adverse effect due to a variation in the electric discharge position P, corresponds to a value obtained by substracting voltage drop components attributable to the wire resistance and inductance between the conductors 4 and 5 from the sum of the same voltage drop components and the voltage which accurately corresponds to the gap voltage Vg. As a consequence, the output voltage of the amplifier represents the gap voltage accurately.

The present invention is not limited to the aforementioned embodiment, but may be modified in various ways. For instance, although, in the embodiment, the sum of the voltage between the upper conductor 4 and the workpiece 3 and the voltage between the lower conductor 5 and the workpiece 3 is corrected by voltage drop components so as to detect the gap voltage, the sum may be detected as the gap voltage.

We claim:

1. A gap voltage detector in wire-cut electric discharge machine, comprising:
   means for detecting a first voltage between a first conductor and a workpiece;
   means for detecting a second voltage between said workpiece and a second conductor which is disposed in a position opposite said first conductor; and
   means for detecting a gap voltage on the basis of the sum of the thus detected first and second voltages.

2. A gap voltage detector according to claim 1, further including:

means for detecting an electric discharge current; and
means for detecting a differential value of the electric discharge current with respect to the time;
wherein said gap voltage detector is operable to detect a first voltage drop component, attributable to a wire resistance between said first and second conductors, and a second voltage drop component, attributable to an inductance between said first and second conductors, on the basis of the detected electric discharge current and its differential value, and is further operable to adjust the sum of said first and second voltages by the use of the detected first and second voltage drop components, so as to detect the gap voltage.

* * * * *

UNITED STATES PATENT AND TRADEMARK OFFICE
CERTIFICATE OF CORRECTION

PATENT NO. : 5,006,693
DATED : APRIL 9, 1991
INVENTOR(S) : HARUKI OBARA ET AL.

It is certified that error appears in the above-identified patent and that said Letters Patent is hereby corrected as shown below:

Col. 2, line 23, "FIG. 2" should be --FIG. 1--.

Col. 3, line 52, "VG26" should be --VG = --;
line 67, "V1" should be --VL--.

Col. 4, line 26, "(L" should be --((L--;
"dt" should be --dt)--; and
"2)" should be --2))--;
line 34, "that" should be --than that of--;
line 35, "to" should be deleted;
line 36, "2VG" should be --2Vg--;
line 37, "After all," should be deleted.

Col. 5, line 3, "the" should be deleted.

Signed and Sealed this

Fifteenth Day of September, 1992

Attest:

DOUGLAS B. COMER

*Attesting Officer*     *Acting Commissioner of Patents and Trademarks*